2,801,864
Patented Aug. 6, 1957

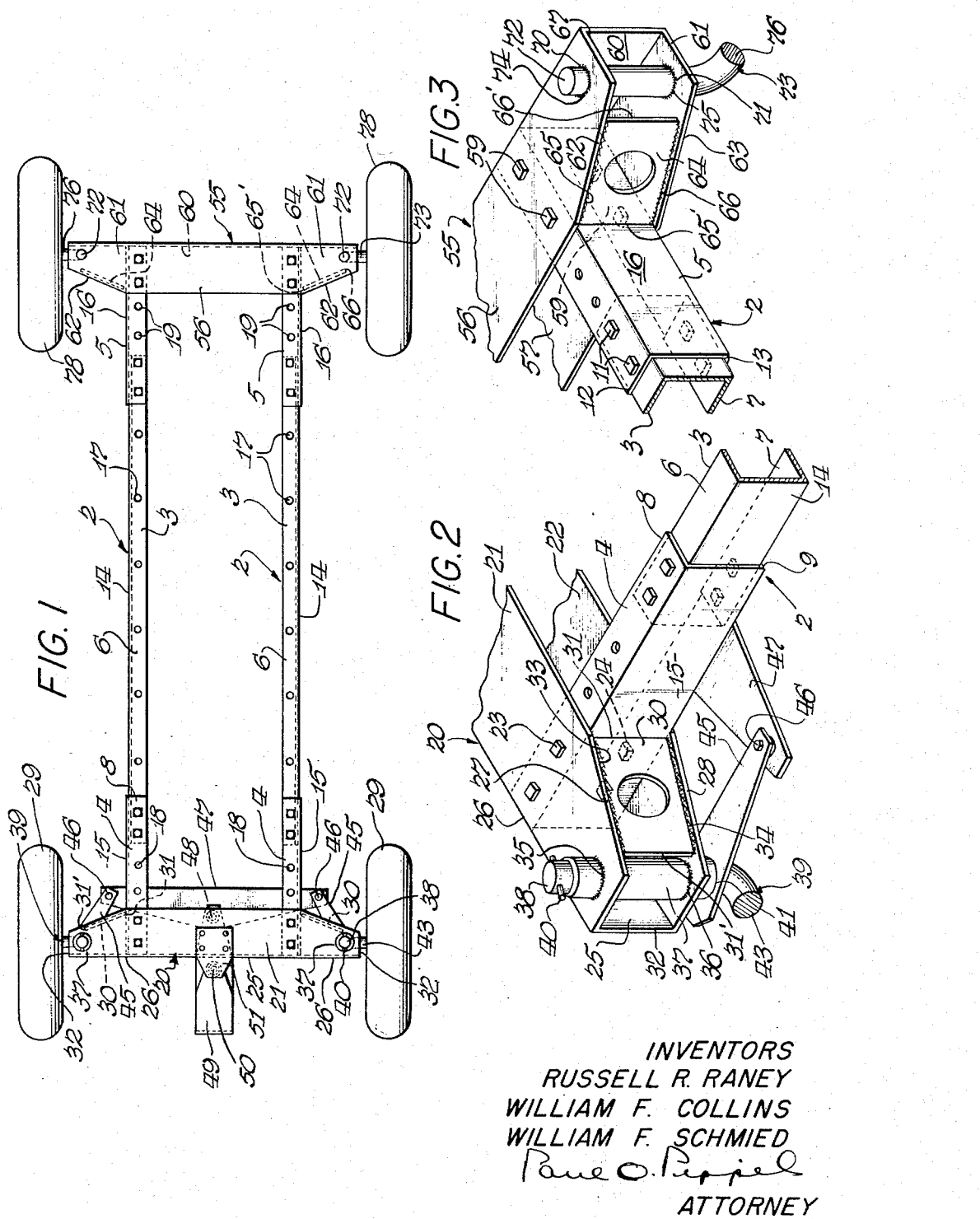
Aug. 6, 1957 — R. R. RANEY ET AL — 2,801,864
WHEEL MOUNTING BOLSTER CONSTRUCTION
FOR VEHICLE RUNNING GEAR
Filed March 15, 1955
INVENTORS
RUSSELL R. RANEY
WILLIAM F. COLLINS
WILLIAM F. SCHMIED
ATTORNEY

United States Patent Office

2,801,864

WHEEL MOUNTING BOLSTER CONSTRUCTION FOR VEHICLE RUNNING GEAR

Russell R. Raney, Western Springs, William F. Collins, Downers Grove, and William F. Schmied, Blue Island, Ill., assignors to International Harvester Company, a corporation of New Jersey Application March 15, 1955, Serial No. 494,488

5 Claims. (Cl. 280—106)

This invention relates to a new and improved running gear for a farm wagon or the like.

An object of the invention is to provide a novel, rugged and light-weight four-wheel running gear for a farm wagon.

The instant invention contemplates the utilization of conventional structural members and wherein the front and rear bolster members are substantially identically formed and which incorporate flexible side sills connected to the bolster members so as to produce a wagon running gear which is capable of movably supporting heavy loads over rough or uneven terrain.

A more specific object of the invention is to provide novel bolster constructions which feature end portions disposed outwardly of the side sill members interconnecting the front and rear bolster members and wherein the end portions comprise continuations of the U-channels of the bolster and certain edges of the top and bottom webs being sheared away on a diagonal with respect to the vertical web of the channel, and interconnected by a diagonal member which thus rigidifies the end portion longitudinally as well as transversely and provides a simple and effective structure for resisting not only bending forces but also torsional forces imposed by the wheels which are mounted from the end portions.

The foregoing and other important objects and desirable features inherent in and encompassed by the invention together with many of the purposes and uses thereof will become readily apparent from the following description in conjunction with the annexed drawings, wherein:

Figure 1 is a plan view of a wagon running gear constructed in accordance with the invention;

Figure 2 is an enlarged fragmentary perspective view of a portion of the front bolster and side sill member connected thereto; and Figure 3 is an enlarged perspective view of a portion of the rear bolster and side sill member connected thereto.

Referring to the drawings in which like reference characters designate like elements throughout the various views, there is shown a wagon running gear or undercarriage structure adapted to have a platform, wagon box or other material carrying device not shown mounted directly thereupon. The wagon running gear comprises a longitudinal reach structure including a pair of transversely spaced longitudinally extending horizontal side sill members generally indicated 2, 2 each of which includes a center reach portion 3 and end portions 4 and 5. The center section 3 is connected as by bolts through its upper and lower flanges 6 and 7 to the top and bottom flanges 8 and 9, respectively, of the channel-shaped front section 4 into which the center section 3 is telescoped. Similarly the rear ends of the center portions 3, 3 are telescoped within the channel-shaped rear end sections 5, 5 and the top and bottom webs 6 and 7 are bolted as by bolts 11 to the top and bottom flanges 12 and 13 of the related section 5. It will be appreciated that the top and bottom flanges of the respective sections of the side sill members are flanged or extend inwardly and that the flanges 6 and 7 of the center portion interconnect with an outboard vertical wall 14 and the flanges 8 and 9 of the forward portions 4 are interconnected with a vertical wall 15 and that the flanges 12 and 13 are interconnected by an outboard vertical wall 16. It will also be noted that the center sections 3 are provided with a series of vertical holes 17 in their top and bottom flanges and that the sections 4 are provided with similar openings 18 and that the top and bottom flanges of the rear sections 5 are provided with openings 19 in order to obtain adjustability of the sill sections in order to shorten or lengthen the running gear so as to accommodate various length boxes.

The front portion 4 of each side sill 2 extends into a front bolster member 20 between the top and bottom webs 21 and 22 thereof, and the top web 21 overlies the top flange 8 and is connected thereto as by bolts 23 and the bottom web 22 underlies the flange 9 and is connected thereto by bolts 24. The bolster 20 is provided with a front wall 25 which interconnects with the forward margins of the top and bottom webs or flanges 21 and 22 of the channel-shaped U-section front bolster 20 and the wall 25 extends across the front ends of the sill members 2, 2. It will be readily appreciated from a consideration of Figure 2 that the top and bottom webs 21 and 22 are substantially broader or wider than the vertical wall 25 and that the bolster 20 has end portions 26 which extend outwardly or outboardly of the respective side sills 2, 2. The end portions 26 are essentially continuations of the top and bottom webs 21 and 22 and the front wall member 25 and are provided with rear edges on the top and bottom webs 21 and 22 which are cut diagonally and generally parallel to each other and substantially vertically aligned and converge in a direction toward the outer ends or extremities of the end portions with said front wall 25 in generally horizontal planes. This provides a space for accommodating the related front wheel 29 during turning, as will be readily perceived from a consideration of Figure 1.

In order to develop the utmost strength in the end portions pursuant to the instant invention, a connecting plate or member 30 is disposed in an upright position between the top and bottom walls 21 and 22 at said end portions and said plate has an inner edge 31 disposed substantially against the outer side of the wall member 15 of the front end portion 4 of the related side sill and extends in a vertical plane generally parallel to the edges 27 and 28 and the plate 30 has its outer edge 31' disposed adjacent to the outer edge or extremity 32 of the related end portion 26. It will be appreciated that the disposition of the plate 30 in diagonally outwardly converging relationship to the wall member 25 thus develops not only vertical rigidity because of the interconnection with the top and bottom members 21 and 22 but also because of its substantial engagement at the edge 31 with the outboard side of the wall member 15. The plate 30 is connected as by welding along its top and bottom edges 33 and 34 to the adjacent regions of the inner sides of the top and bottom walls 21 and 22.

The top and bottom walls 21 and 22 at each portion are apertured as at 35 and 36 to provide vertically aligned holes and accommodate a wheel-sustaining element in the form of a sleeve 37 which is weld-connected to the webs 21 and 22 and receives a vertical shank portion 38 therethrough of a wheel support spindle element generally indicated 39. The upper end of the spindle portion is provided with a locking cotter key 40 and the bottom portion is provided with a stop collar 41 which prevents the spindle from dropping out downwardly or moving upwardly respectively and the collar 41 is welded on to or formed integral with the lower end of portion 38 and engages with the lower edge of the related sleeve 37. The lower end of each spindle 38 is integrally merged with a substantially horizontally outwardly extending axle portion 43 on which the hub (not shown) of the related wheel 29 is journaled.

The collar 41 of each wheel-sustaining element 39 is integrally united with the forward end of a rearwardly extending steering arm member 45 and the rear ends of the members 45 of the front wheels are pivoted as at 46 to the respective ends of a transversely extending tie bar 47 which intermediate its ends is pivotally connected as at 48 to the rear end of a hitch member or tie bar or wagon tongue 49 which intermediate its ends is pivoted as at 50 from bracket means 51 which are mounted on the top and bottom walls of the front bolster and project forwardly therefrom. It will be appreciated that angling of the member 49 will move the tie bar 47 transversely of the wagon and will, therefore, effect, through the arms 45, steering of the wheel 29.

It will be further understood that the sleeves 37 which serve as interconnecting columns between the top and bottom walls 21 and 22 are disposed outboardly of the outer edges 31 of the vertical connecting plates or members 30 and in effect serve as load-sustaining continuation means thereof.

From a consideration of Figures 1 and 3 it will be appreciated that the rear bolster member generally indicated 55 is substantially identical with the front bolster member and that the top and bottom webs thereof 56 and 57 project forwardly in overlying and underlying relationship respectively to the top and bottom flanges 12 and 13 of the rear end portions 5 of the respective side sill members 2. The top and bottom walls 56 and 57 are connected to the adjacent webs 12 and 13 as by bolts 59 and along their rear edges they are connected by an integral vertical rear wall 60 which extends across the rear extremities of the sill members 2, 2. The rear bolster member extends outwardly of the side sills 2, 2 and develops end portions 61, 61 which are substantially identical with the portions 26, 26 and at the rear portion the top and bottom webs 56 and 57 are sheared diagonally to provide rear edge portions 62 and 63 which converge toward the outboard end of the related end portion in horizontal planes toward the rear wall 60. The top and bottom webs 56 and 57 of the end portions are interconnected by vertical plates or members 64 which generally parallel the edges 62 and 63 and are positioned thereadjacent and weld-connected to the inner sides of the top and bottom walls along their top and bottom edges as at 65 and 66. The inboard edges 65' of the wall members 64 seat against the outboard sides of the walls 16 of the sill portions 5. The top and bottom webs 56 and 57 in an area outboardly of the outer edge 66' of each connecting member 64 are provided with vertically registering openings 70 and 71 which receive the vertical spindle portion 72 of rear wheel mounting means generally indicated 73 and the spindle is preferably weld-connected as at 74 and 75 to the top and bottom webs 56 and 57 and serves as a column or member interconnecting the top and bottom webs 56 and 57.

The lower ends of the spindle portion 72 of the rear wheel mounting means 73 are merged into outwardly extending axle portions 76 on which the hubs (not shown) of the rear wheels 78 are journaled.

Thus it will be seen that a novel running gear is developed with exceptionally rigid end portions and wherein the front and rear bolster members are of substantially like construction with the top and bottom webs thereof of broader width than the vertical webs.

The embodiment to the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvements sought to be effected. It will be understood that the particular structural and functional aspects emphasized herein are not intended to exclude but rather to suggest such other modifications and adaptations as fall within the spirit and scope of the invention as defined in the appended claims.

What is claimed is:

1. A vehicle running gear comprising a reach structure, a transverse bolster connected to said structure and comprising top and bottom generally horizontal webs and an intervening vertical web, said bolster having end portions outboardly of said reach structure and each end portion having edges on said top and bottom webs remote from said vertical web disposed in converging relation to said vertical web in a direction toward the adjacent outer extremity of the related end portion, a vertical connecting member in each end portion disposed between and connected to said webs and extending generally parallel to the adjacent edges in transverse and longitudinal rigidifying relationship to the respective end portion, and vehicle wheel-support means mounted in each end portion and connected to certain of said webs.

2. A vehicle running gear comprising a reach structure including a pair of longitudinally extending sill members, a transverse bolster connected to said members and comprising top and bottom generally horizontal webs and an intervening vertical web, said bolster having end portions outboardly of said members and each end portion having edges on said top and bottom webs remote from said vertical web disposed in converging relation to said vertical web in a direction toward the adjacent outer extremity of the related end portion, a vertical connecting member in each end portion disposed between and connected to said webs and extending along and generally parallel to the adjacent edges in transverse and longitudinal rigidifying relationship to the respective end portion, vehicle wheel-support means mounted in each end portion and connected to certain of said webs, and each said connecting member comprising a plate having an inner edge seated against the outer side of the adjacent sill member and converging with the vertical web toward the outer end of the related end portion.

3. A vehicle running gear comprising a reach structure, a transverse bolster connected to said structure and comprising top and bottom generally horizontal webs and an intervening vertical web, said bolster having end portions outboardly of said reach structure and each end portion having edges on said top and bottom webs remote from said vertical web disposed in converging relation to said vertical web in a direction toward the adjacent outer extremity of the related end portion, a vertical connecting member in each end portion disposed between and connected to said webs and extending generally parallel to the adjacent edges in converging relation with the vertical web toward the outer extremity of the related end portion in transverse and longitudinal rigidifying relationship thereto, and vehicle wheel-support means mounted in each end portion and connected to certain of said webs, each said member being terminated inboardly of the outer extremity of the respective end portion, and each said wheel-support means disposed at least partially outboardly of the adjacent connecting member.

4. A vehicle running gear comprising a reach structure including a pair of longitudinally extending sill members, a transverse bolster connected to said members and comprising top and bottom generally horizontal webs and an intervening vertical web, said bolster having end portions outboardly of said members and each end portion having said top and bottom webs with edges remote from said vertical web disposed in converging relation to said vertical web in a direction toward the adjacent outer extremity of the related end portion, a vertical connecting member in each end portion disposed between and connected to said webs and extending generally parallel to the adjacent edges in converging relation to the vertical web in a direction toward the outer extremity of the related end portion for transversely and longitudinally rigidifying the same, vehicle wheel-support means mounted in each end portion and connected to certain of said webs, and each said connecting member comprising a plate having an inner edge seated against the outer side of the adjacent sill member for resisting bending moments on the respective end portion against the sill member.

5. A vehicle running gear comprising a pair of laterally spaced generally horizontal fore and aft extending side sills, front and rear channel-shaped bolsters each having a vertical wall and top and bottom webs embracing the respective ends of said sills and connected thereto, said bolster walls and webs extending outwardly of said side sills and providing end portions, said webs of each bolster end portion having vertical edges remote from the respective wall angled in a generally horizontal plane in converging relation thereto toward the adjacent outboard extremity, an upright connecting plate extending between and connected to the webs of each end portion along and generally parallel to the said edges thereof and having an inboard edge disposed against the adjacent side sill, and wheel-supporting means extending through openings in the webs of each end portion and connected thereto.

References Cited in the file of this patent

UNITED STATES PATENTS

| | | |
|---|---|---|
| 2,136,122 | Almdale | Nov. 8, 1938 |
| 2,669,461 | Raney | Feb. 16, 1954 |